United States Patent
Pradeep et al.

(10) Patent No.: US 9,767,040 B2
(45) Date of Patent: Sep. 19, 2017

(54) SYSTEM AND METHOD FOR GENERATING AND STORING REAL-TIME ANALYTICS METRIC DATA USING AN IN MEMORY BUFFER SERVICE CONSUMER FRAMEWORK

(71) Applicant: SALESFORCE.COM, INC., San Francisco, CA (US)

(72) Inventors: Aakash Pradeep, Union City, CA (US); Adam Torman, Walnut Creek, CA (US); Samarpan Jain, Fremont, CA (US); Alex Warshavsky, Walnut Creek, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 88 days.

(21) Appl. No.: 14/841,503

(22) Filed: Aug. 31, 2015

(65) Prior Publication Data
US 2017/0060771 A1  Mar. 2, 2017

(51) Int. Cl.
*G06F 12/12* (2016.01)
*G06F 12/02* (2006.01)

(52) U.S. Cl.
CPC ............ *G06F 12/12* (2013.01); *G06F 12/023* (2013.01); *G06F 2212/1044* (2013.01)

(58) Field of Classification Search
CPC .................. G06F 12/12; G06F 12/023; G06F 2212/1044; G06F 12/02
USPC ....................................................... 711/159
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

FOREIGN PATENT DOCUMENTS

WO    WO 2004099983 A1 *  11/2004  ............. G06F 9/461

OTHER PUBLICATIONS

Grover, Mark; "Processing frameworks for Hadoop—How to decide which framework is best for your particular use case" dated Feb. 16, 2015; retrieved from the internet at <http://radar.oreilly.com/2015/02/processing-frameworks-for-hadoop.html; 10 pages.

*Primary Examiner* — Pierre-Michel Bataille
(74) *Attorney, Agent, or Firm* — Schwabe Williamson & Wyatt

(57) ABSTRACT

In an example, a processing system of a database system may categorize event data taken from logged interactions of users with a multi-tenant information system to provide a metric. Event roll-up aggregate metrics used to provide the metric may be generated in connection with event capture. The processing system of the database system may periodically calculate the metric for a particular one of the tenants, and electronically store the periodically calculated metrics for accessing responsive to a query of the particular tenant.

20 Claims, 13 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,667,212 B2 * | 3/2014 | McWilliams ....... G06F 12/0284 711/103 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |

(56) References Cited

U.S. PATENT DOCUMENTS

| | | |
|---|---|---|
| 2005/0091098 A1 | 4/2005 | Brodersen et al. |
| 2008/0022288 A1* | 1/2008 | Bekooij ................. G06F 9/4887 718/107 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0053059 A1* | 2/2014 | Weber ................. G06F 9/45529 715/234 |
| 2014/0359537 A1 | 12/2014 | Jackobson et al. |

* cited by examiner

SYSTEM AND METHOD FOR GENERATING AND STORING REAL-TIME ANALYTICS METRIC DATA USING AN IN MEMORY BUFFER SERVICE CONSUMER FRAMEWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending non-provisional United States patents and patent applications, including the present application, may be related to each other. Each of the other patents/applications are incorporated by reference herein in its entirety:

U.S. patent application Ser. No. 14/688,989 entitled EXTRACTING AND PROCESSING METRICS FROM SYSTEM GENERATED EVENTS, filed Apr. 16, 2015.

U.S. patent application Ser. No. 14/688,917 entitled EXTRACTION AND CAPTURE OF INFORMATION FROM CUSTOMIZABLE HEADER, filed Apr. 16, 2015.

U.S. patent application Ser. No. 14/705,750 entitled IN-MEMORY BUFFER SERVICE, filed May 6, 2015.

FIELD OF THE INVENTION

One or more implementations relate generally to generating and storing real-time analytics metric data using an in memory buffer service consumer framework.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Many multi-tenant database system today produce system generated events such as logins, downloads, transactions, or anything that can be construed as an application event associated with a specific customer instance. These systems provide for various forms of electronic communication between customers and host system.

It has become common practice for institutions to extract electronic communication information from these systems. Given the affordability of data storage and the potential necessity of such information, many institutions retain electronic copies of information. For example, in industries such as financial and legal services as well as many others, it is often important to maintain a "paper trail". Information such as what information is being accessed by whom, and when it is being accessed may be required for audits or investigations. In certain cases, electronic records may even be subpoenaed, and file storage devices that store such information may be subject to computer forensic searches.

BRIEF DESCRIPTION OF THE DRAWINGS

In the following drawings like reference numbers are used to refer to like elements. Although the following figures depict various examples, the one or more implementations are not limited to the examples depicted in the figures.

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
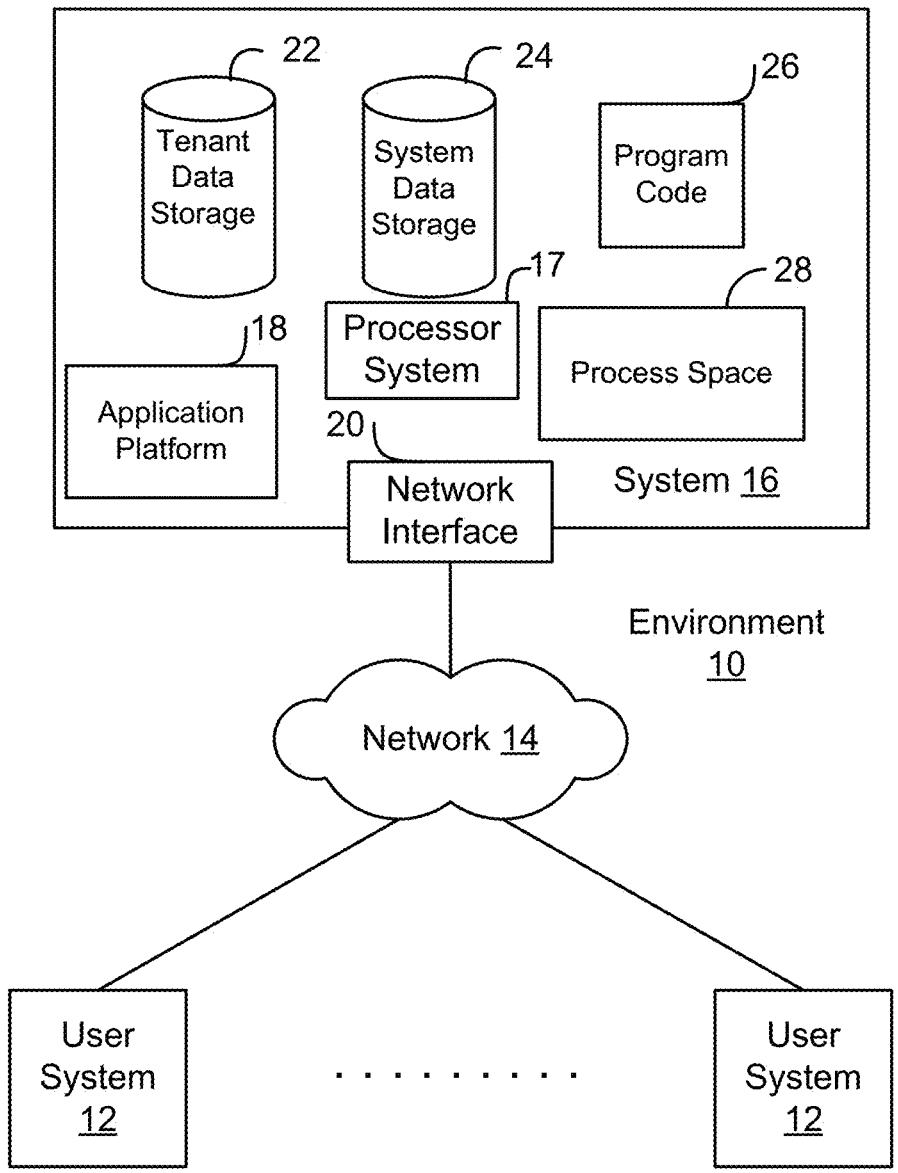
FIG. 1A shows a block diagram of an example environment in which an on-demand database service can be used according to some implementations.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for generating and storing real-time analytics metric data using an in memory buffer service consumer framework. Some implementations described and referenced herein are directed to a consumer framework.

Commonly owned, co-pending non-provisional United States patents and patent application Ser. No. 14/688,989 entitled EXTRACTING AND PROCESSING METRICS FROM SYSTEM GENERATED EVENTS, filed Apr. 16, 2015, describes a system for extracting and processing metrics from system generated events. In one example of such a system, event roll-up aggregate metrics may be generated after the event is captured, for instance, at an interval, such as every hour. In the present application, in some implementations, event roll-up aggregate metrics may be generated at a different time, such as in connection with capturing the event.

In some implementations, a database system including a first bounded buffer, e.g. a first concurrent bounded buffer, and a first buffer flush regulator may be provided. The first buffer flush regulator may be configured to enforce a first load factor associated with the first bounded buffer by flushing objects from the first bounded buffer according to a first predetermined object lifetime threshold and/or a first predetermined time interval. The database system may include a memory device storing first instructions and second instructions. Each first instruction may define a respective consumer of a first set of consumers. A first one of the consumers of the first set may consume objects of a first type from the first bounded buffer. Each second instruction may define a task node for each consumer and assign a synchronous executor, a time bounded executor, or an asynchronous executor to a respective one of the consumers. In an example, a task node corresponding to a second different one of the consumers of the first set is to generate objects of a second type that is different than the first type for consumption by a consumer of a second set that is different than the first set. In some implementations, the objects of the first type may be original data and the objects of the second type may be derived data.

In some implementations, the database system may generate event roll-up aggregate metrics in connection with capturing the events. A first one of the consumers may obtain event data from the first bounded buffer. A task node corresponding to a second different one of the consumers may output metric data.

In some implementations, the database system may include a second bounded buffer, e.g. a second concurrent bounded buffer, and a second buffer flush regulator. The second buffer flush regulator may be configured to enforce a second load factor associated with the first bounded buffer by flushing objects from the second bounded buffer according to a second predetermined object lifetime threshold that is different than the first predetermined object lifetime threshold and/or a second predetermined time interval that is different than the first predetermined time interval. The objects of the second type that are output by the task node corresponding to the second one of the consumers are input to the second bounded buffer, and the task node corresponding to the consumer of the second set consumes from the second bounded buffer. The second predetermined object lifetime threshold may be greater than the first predetermined object lifetime threshold and/or the second predetermined time interval may be greater than the first predetermined time interval. The thresholds and the intervals may be configurable. In some implementations, the second predetermined threshold may be greater than the first predetermined threshold by a configurable factor. In some implementations, the first predetermined threshold may be on a scale of seconds, e.g. ten of seconds, and the second predetermined threshold may be on a scale of minutes (i.e. the configurable factor may be set or settable to at least six), e.g. 5-10 minutes. In some implementations, the second predetermined time interval may be greater than the first predetermined time interval by a configurable factor, and the configurable factor may be set or settable to at least six.

I. Example System Overview

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
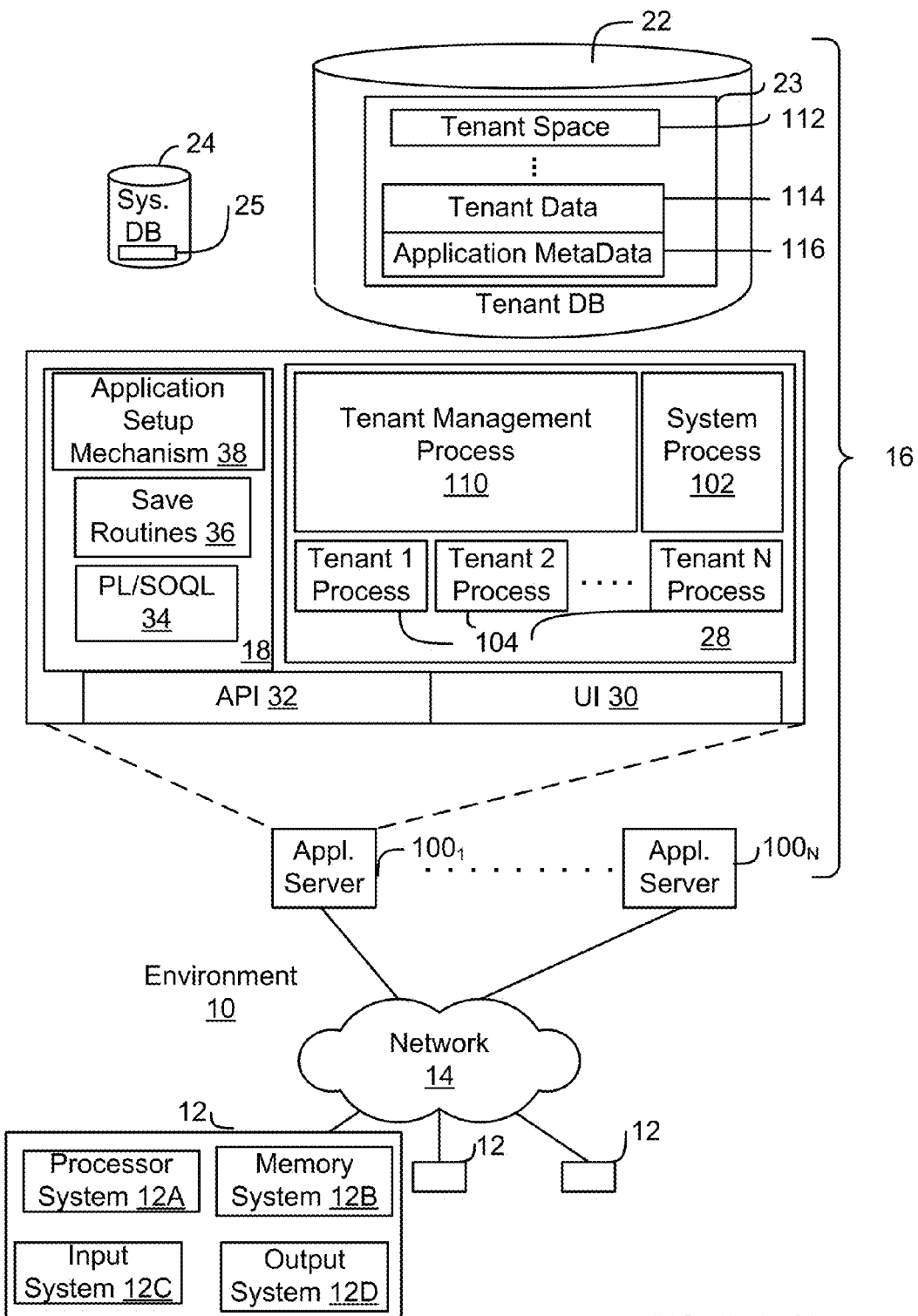
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more Structured Query Language (SQL) statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
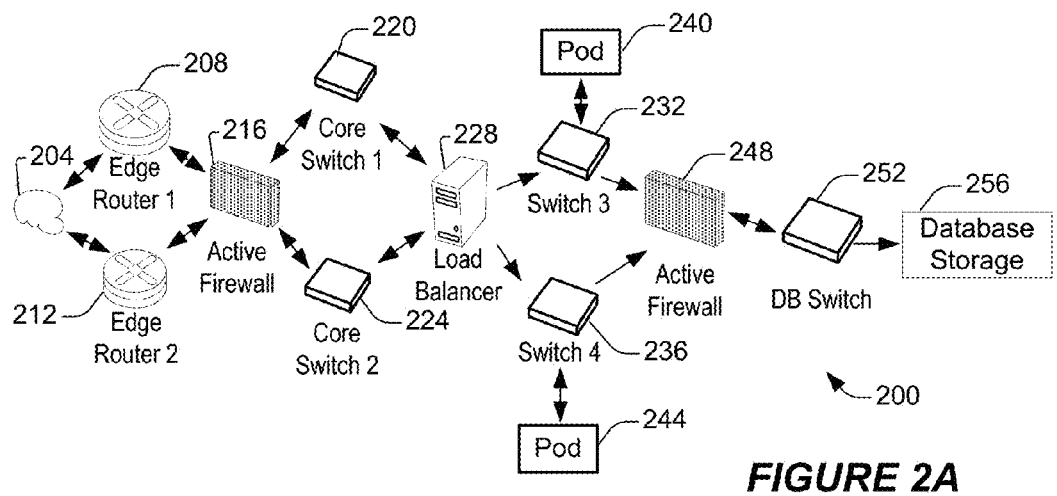
FIG. 2A shows a system diagram of example architectural components of an on-demand database service environment according to some implementations.

FIG. 2A shows a system diagram illustrating example architectural components of an on-demand database service environment 200 according to some implementations. A client machine communicably connected with the cloud 204, generally referring to one or more networks in combination, as described herein, can communicate with the on-demand database service environment 200 via one or more edge routers 208 and 212. A client machine can be any of the examples of user systems 12 described above. The edge routers can communicate with one or more core switches 220 and 224 through a firewall 216. The core switches can communicate with a load balancer 228, which can distribute server load over different pods, such as the pods 240 and 244. The pods 240 and 244, which can each include one or more servers or other computing resources, can perform data processing and other operations used to provide on-demand services. Communication with the pods can be conducted via pod switches 232 and 236. Components of the on-demand database service environment can communicate with database storage 256 through a database firewall 248 and a database switch 252.

Figure 2B:
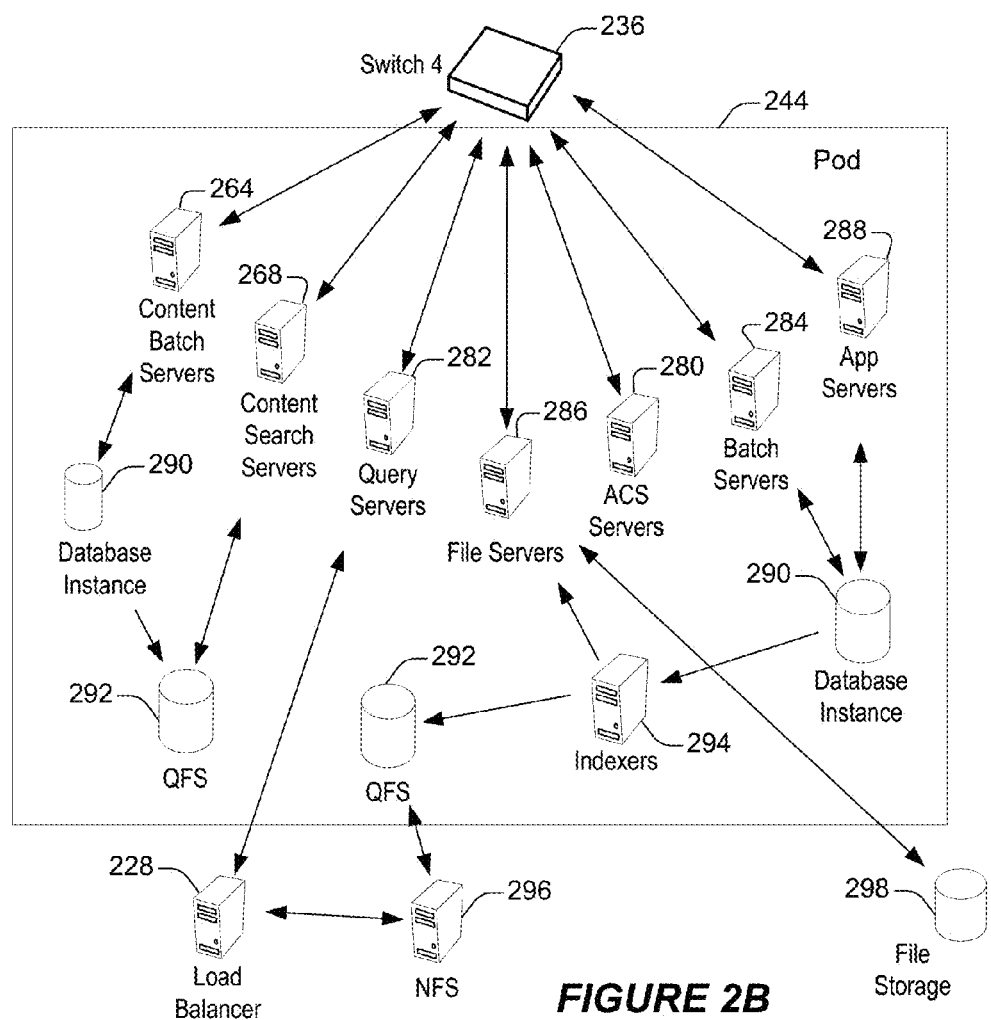
FIG. 2B shows a system diagram further illustrating example architectural components of an on-demand database service environment according to some implementations.

As shown in FIGS. 2A and 2B, accessing an on-demand database service environment can involve communications transmitted among a variety of different hardware or software components. Further, the on-demand database service environment 200 is a simplified representation of an actual on-demand database service environment. For example, while only one or two devices of each type are shown in FIGS. 2A and 2B, some implementations of an on-demand database service environment can include anywhere from one to several devices of each type. Also, the on-demand database service environment need not include each device shown in FIGS. 2A and 2B, or can include additional devices not shown in FIGS. 2A and 2B.

Additionally, it should be appreciated that one or more of the devices in the on-demand database service environment 200 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 204 is intended to refer to a data network or multiple data networks, often including the Internet. Client machines communicably connected with the cloud 204 can communicate with other components of the on-demand database service environment 200 to access services provided by the on-demand database service environment. For example, client machines can access the on-demand database service environment to retrieve, store, edit, or process information. In some implementations, the edge routers 208 and 212 route packets between the cloud 204 and other components of the on-demand database service environment 200. For example, the edge routers 208 and 212 can employ the Border Gateway Protocol (BGP). The BGP is the core routing protocol of the Internet. The edge routers 208 and 212 can maintain a table of IP networks or 'prefixes', which designate network reachability among autonomous systems on the Internet.

In some implementations, the firewall 216 can protect the inner components of the on-demand database service environment 200 from Internet traffic. The firewall 216 can block, permit, or deny access to the inner components of the on-demand database service environment 200 based upon a set of rules and other criteria. The firewall 216 can act as one or more of a packet filter, an application gateway, a stateful filter, a proxy server, or any other type of firewall.

In some implementations, the core switches 220 and 224 are high-capacity switches that transfer packets within the on-demand database service environment 200. The core switches 220 and 224 can be configured as network bridges that quickly route data between different components within the on-demand database service environment. In some implementations, the use of two or more core switches 220 and 224 can provide redundancy or reduced latency.

In some implementations, the pods 240 and 244 perform the core data processing and service functions provided by the on-demand database service environment. Each pod can include various types of hardware or software computing resources. An example of the pod architecture is discussed in greater detail with reference to FIG. 2B. In some implementations, communication between the pods 240 and 244 is conducted via the pod switches 232 and 236. The pod switches 232 and 236 can facilitate communication between the pods 240 and 244 and client machines communicably connected with the cloud 204, for example via core switches 220 and 224. Also, the pod switches 232 and 236 may facilitate communication between the pods 240 and 244 and the database storage 256. In some implementations, the load balancer 228 can distribute workload between the pods 240 and 244. Balancing the on-demand service requests between the pods can assist in improving the use of resources, increasing throughput, reducing response times, or reducing overhead. The load balancer 228 may include multilayer switches to analyze and forward traffic.

In some implementations, access to the database storage 256 is guarded by a database firewall 248. The database firewall 248 can act as a computer application firewall operating at the database application layer of a protocol stack. The database firewall 248 can protect the database storage 256 from application attacks such as structure query language (SQL) injection, database rootkits, and unauthorized information disclosure. In some implementations, the database firewall 248 includes a host using one or more forms of reverse proxy services to proxy traffic before passing it to a gateway router. The database firewall 248 can inspect the contents of database traffic and block certain content or database requests. The database firewall 248 can work on the SQL application level atop the TCP/IP stack, managing applications' connection to the database or SQL management interfaces as well as intercepting and enforcing packets traveling to or from a database network or application interface.

In some implementations, communication with the database storage 256 is conducted via the database switch 252. The multi-tenant database storage 256 can include more than one hardware or software components for handling database queries. Accordingly, the database switch 252 can direct database queries transmitted by other components of the on-demand database service environment (for example, the pods 240 and 244) to the correct components within the database storage 256. In some implementations, the database storage 256 is an on-demand database system shared by many different organizations as described above with reference to FIGS. 1A and 1B.

FIG. 2B shows a system diagram further illustrating example architectural components of an on-demand database service environment according to some implementations. The pod 244 can be used to render services to a user of the on-demand database service environment 200. In some implementations, each pod includes a variety of servers or other systems. The pod 244 includes one or more content batch servers 264, content search servers 268, query servers 282, file force servers 286, access control system (ACS) servers 280, batch servers 284, and app servers 288. The pod 244 also can include database instances 290, quick file systems (QFS) 292, and indexers 294. In some implementations, some or all communication between the servers in the pod 244 can be transmitted via the switch 236.

In some implementations, the app servers 288 include a hardware or software framework dedicated to the execution of procedures (for example, programs, routines, scripts) for supporting the construction of applications provided by the on-demand database service environment 200 via the pod 244. In some implementations, the hardware or software framework of an app server 288 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 264 can handle requests internal to the pod. Some such requests can be long-running or not tied to a particular customer. For example, the content batch servers 264 can handle requests related to log mining, cleanup work, and maintenance tasks. The content search servers 268 can provide query and indexer functions. For example, the functions provided by the content search servers 268 can allow users to search through content stored in the on-demand database service environment. The file force servers 286 can manage requests for information stored in the Fileforce storage 298. The Fileforce storage 298 can store information such as documents, images, and basic large objects (BLOBs). By managing requests for information using the file force servers 286, the image footprint on the database can be reduced. The query servers 282 can be used to retrieve information from one or more file systems. For example, the query system 282 can receive requests for information from the app servers 288 and transmit information queries to the NFS 296 located outside the pod.

The pod 244 can share a database instance 290 configured as a multi-tenant environment in which different organizations share access to the same database. Additionally, services rendered by the pod 244 may call upon various hardware or software resources. In some implementations, the ACS servers 280 control access to data, hardware resources, or software resources. In some implementations, the batch servers 284 process batch jobs, which are used to run tasks at specified times. For example, the batch servers 284 can transmit instructions to other servers, such as the app servers 288, to trigger the batch jobs.

In some implementations, the QFS 292 is an open source file system available from Sun Microsystems® of Santa Clara, Calif. The QFS can serve as a rapid-access file system for storing and accessing information available within the pod 244. The QFS 292 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 268 or indexers 294 to identify, retrieve, move, or update data stored in the network file systems 296 or other storage systems.

In some implementations, one or more query servers 282 communicate with the NFS 296 to retrieve or update information stored outside of the pod 244. The NFS 296 can allow servers located in the pod 244 to access information to access files over a network in a manner similar to how local storage is accessed. In some implementations, queries from the query servers 282 are transmitted to the NFS 296 via the load balancer 228, which can distribute resource requests over various resources available in the on-demand database service environment. The NFS 296 also can communicate with the QFS 292 to update the information stored on the NFS 296 or to provide information to the QFS 292 for use by servers located within the pod 244.

In some implementations, the pod includes one or more database instances 290. The database instance 290 can transmit information to the QFS 292. When information is transmitted to the QFS, it can be available for use by servers within the pod 244 without using an additional database call. In some implementations, database information is transmitted to the indexer 294. Indexer 294 can provide an index of information available in the database 290 or QFS 292. The index information can be provided to file force servers 286 or the QFS 292.

II. Generating and Storing Real-Time Analytics Metric Data Using in Memory Buffer Service Consumer Framework Data taken from logged interactions of users with a multi-tenant information system may be raw event data. The raw event data may include data collected by logged interactions of any number of event types. One example of an event type is a login event, which occurs every time a user logs into an application of the multi-tenant information system. A login might produce raw event data indicating an Application Program Interface (API) type and version if an API is used for the login, a browser and client version if a User Interface (UI) is used for the login, a time of the login, a platform used for the login, an IP address from which the login took place, an identity of the user, whether the login was successful or not, or the like, or combinations thereof.

The amount of raw event data captured from just the login event type for a single user of a single tenant may be significant. For instance, a single user of a single tenant may login say 10 times in an hour, multiple times a week. This is one user of one tenant—there may be a multitude of other users of the same tenant plus a multitude of other user of another tenant all creating login events. And login events may be only one of more than one event type captured by the logging system. Manually querying the raw event data or a login event object, by a tenant (or for the tenant), may consume processing cycles of one or more machines involved with the query, possibly overwhelming computing resources or making those resources partially unavailable for other parallel tasks.

In an example, a group by function is applied at an interval to a login event object to create a platform event metrics object, i.e. to roll up all of the grouped events for the interval. The group by function may be applied to all raw event data available at the interval, or only to the raw event data collected since the previous occurrence of the interval. The platform event metrics object may be exposed to a tenant. The tenant may query the platform event metric object, which may consume less processing cycles than querying the login event object, as described in more detail in co-pending U.S. patent application Ser. No. 14/688,989 entitled EXTRACTING AND PROCESSING METRICS FROM SYSTEM GENERATED EVENTS, filed Apr. 16, 2015.

Event roll-up aggregate metrics may be measurements applied to data, e.g. event data, over time. In contrast to generating event-roll up aggregate metrics after the event is captured, e.g. generating at one hour intervals for events of a preceding hour, in some implementations event roll-up aggregate metrics may be generated in connection with event capture, e.g. generating at a one minute interval. Example metrics may include number of events collected over a given interval (e.g. number of logins collected over an hour), average response time for a given apex class execution in the last time segment calculated (e.g. in the last hour), or the like, or combinations thereof. By moving analytics to be connected or more connected with the point in time the event is generated, real-time metrics may be derived concurrently with event capture, instead of waiting for processing later.

Figure 3:
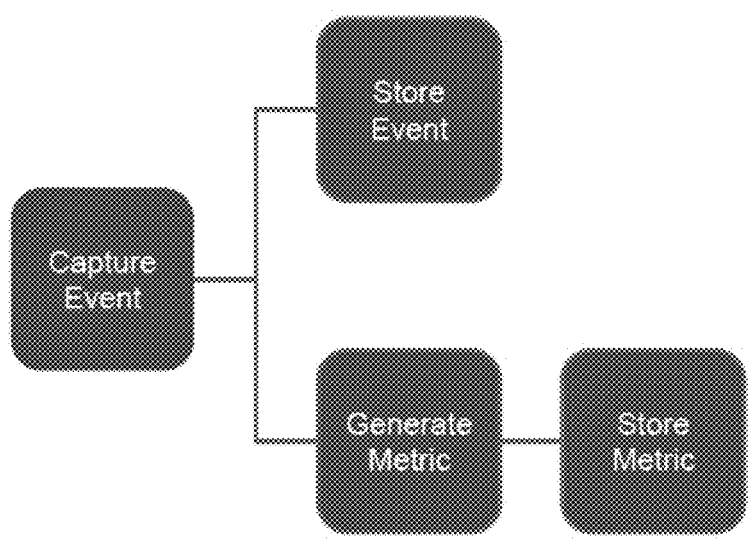
FIG. 3 shows a block diagram of generating metrics in parallel with storing events.
Figure 4:
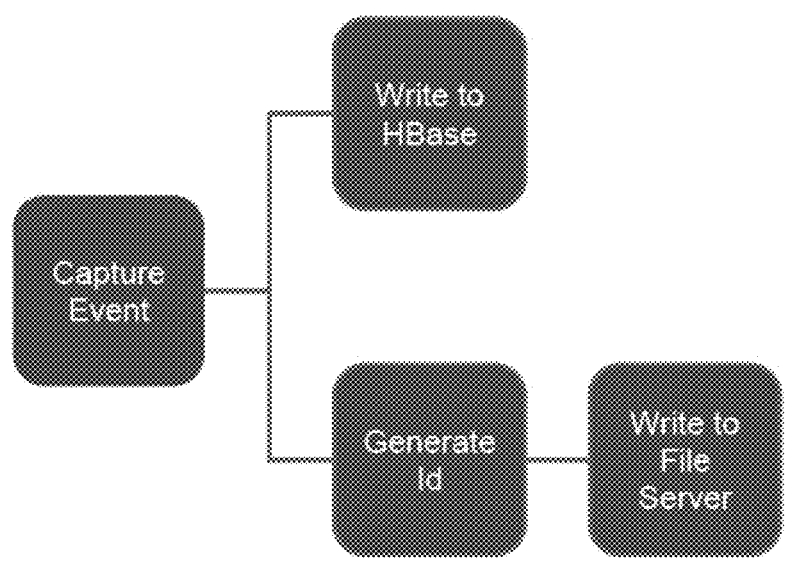
FIG. 4 shows a block diagram of writing to a non-relational distributed database in parallel with ID generation.

In some implementations, a system may use an in memory consumer framework to derive real-time metrics concurrently with event capture. The system may generate metrics in parallel with storing events via a configurable set of workflow steps. FIG. 3 shows generation of metrics in parallel with storing events in a first set of workflow steps. FIG. 4 shows writing to a non-relational distributed database, e.g. HBase, in parallel with ID generation (in some examples ID generation is a process to assign a unique fifteen character identifier to each event object, which will make this event object unique from other event objects captured). In some implementations, the system may use the in memory consumer framework to define other kinds of workflow tasks to be executed efficiently.

Figure 5A:
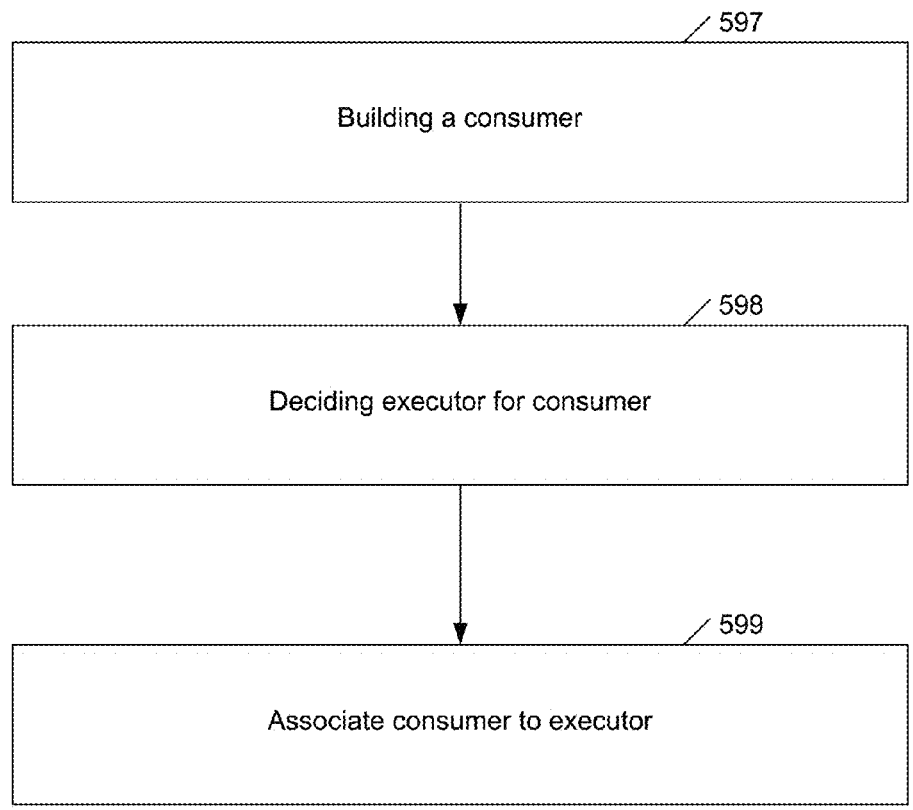
FIG. 5A is an operational flow diagram illustrating a process that may be performed for building a consumer in a consumer framework.

The high level programming constructs for a consumer framework may include a consumer, a consumer executor, and a task node associated with a defined consumer flow. FIG. 5A is an operational flow diagram illustrating a process that may be performed for building a consumer in a consumer framework. In block 597, a consumer is built, which may include defining a processing algorithm and topics. Examples of processing algorithms include ID generation and saving events to a non-relational distributed database, e.g. HBase.

In block 598, an executor may be determined for the consumer. In an example, an executor may be selected from a synchronous executor, a time bounded executor, and an asynchronous executor.

In block 599, the consumer may be associated to the executor. In an example, block 599 may include determining whether the consumer is to be executed as a single task or is to run in parallel with another consumer.

In an example, a consumer framework is a system to define data processing flow, where a user can define the logic to process a set of data classified by a topic name and decide how to execute the logic unit, and can also define a directed acyclic graph of this logic unit in order to decide when to execute which logic unit and how.

A consumer framework may include three components:
 a consumer, which is a place to define the logic unit (the consumer may also be a placeholder to define an association of the logic unit with a data set, which may be defined with strong association of a logical unit with topics)
 an executor, which defines how to execute a consumer (e.g. synchronous, asynchronous, and time bounded)
 a task node, where a user can associate a consumer with an executer (the task node may also define a DAG (Directed Acyclic Graph) of logical units).

The consumer framework may simplify writing a thread based logic unit. This may enable designing a multithreaded system, and may simplify testing the system. The consumer framework may enable defining a dependency tree for different logical units for a given set of data.

Figure 5B:
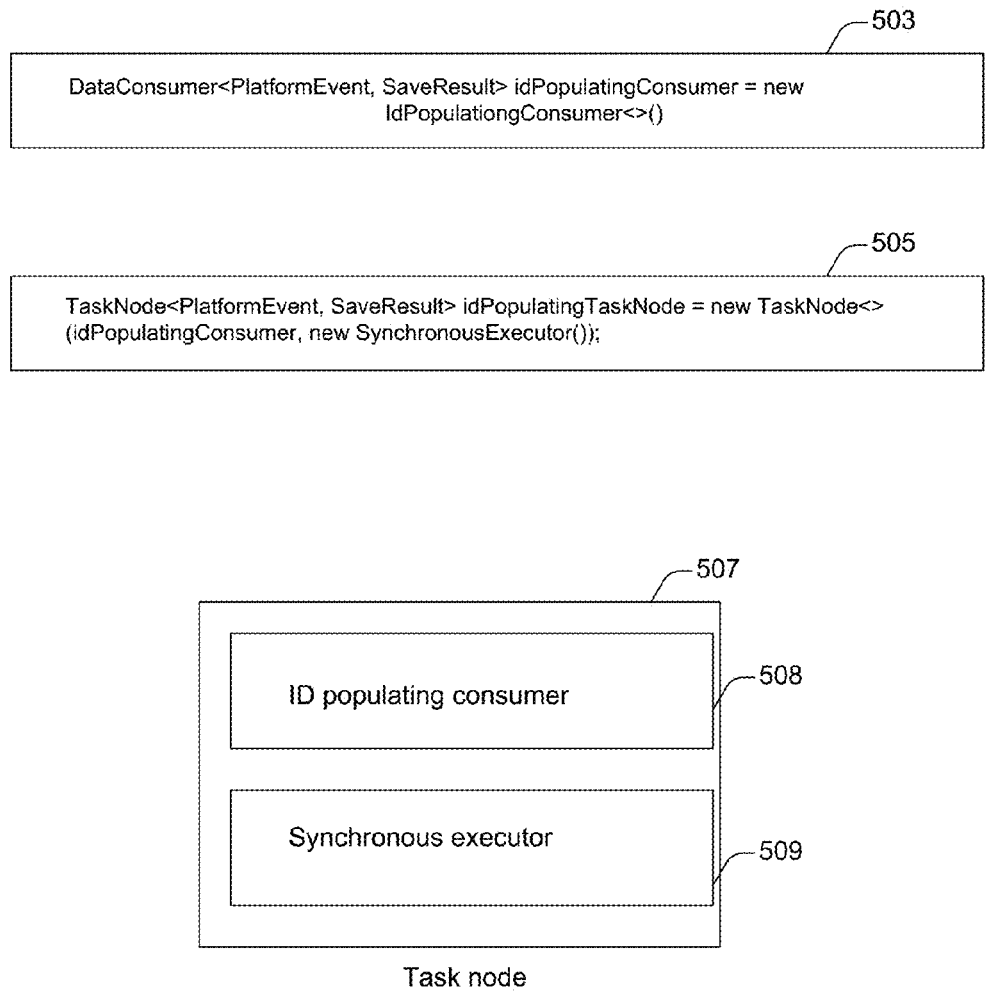
FIG. 5B illustrates example java code to implement an example consumer according to the consumer framework of FIG. 5A.

FIG. 5B illustrates example java code to implement an example consumer. Example java code 503 defines a consumer. Example java code 505 defines a task node for the consumer. A block diagram is shown to illustrate a task node 507, a processing algorithm 508 (i.e. ID populating consumer), and an executor 509 (in this case, a synchronous executor).

Figure 5C:
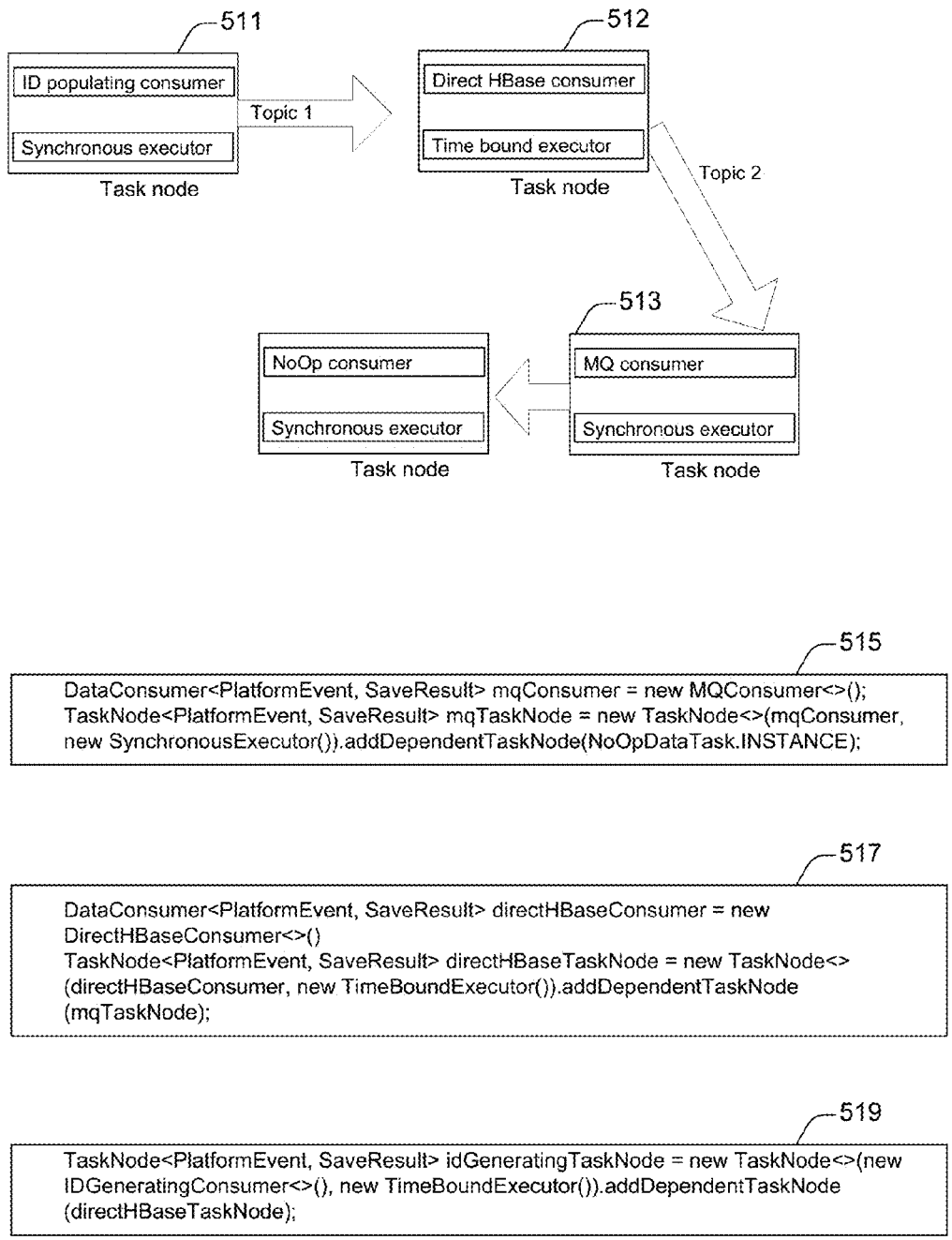
FIGS. 5C-E illustrate block diagrams of example groups of consumers constructed according to the consumer framework of FIG. 5A.

FIG. 5C illustrates example java code to implement an example set of consumers. Example java code 515 defines a first consumer, i.e. MQ consumer (MQ stand for message queue and refers to an extension of Qpid™, an apache open source project). Example java code 517 defines a second consumer, i.e. Direct HBase consumer. In an example, a Direct HBase consumer is a logical unit which is intended to write a group of events to HBase in a time bounded nature. Example java code 519 defines a third consumer, i.e. ID generating consumer. A block diagram is shown to illustrate task nodes 513, 512, and 511, corresponding to the first, second, and third consumers, respectively.

Figure 5D:
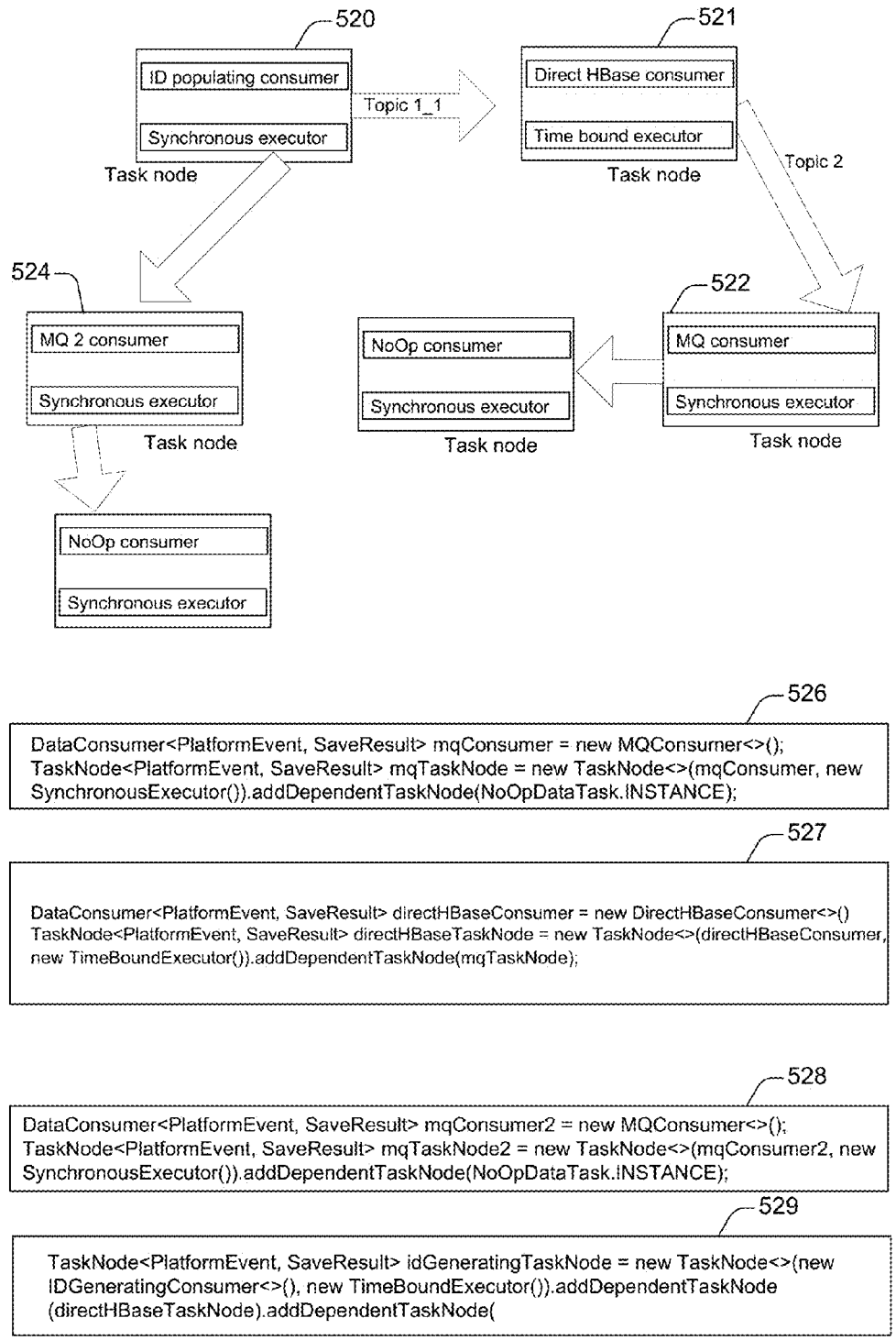
Figure 5E:
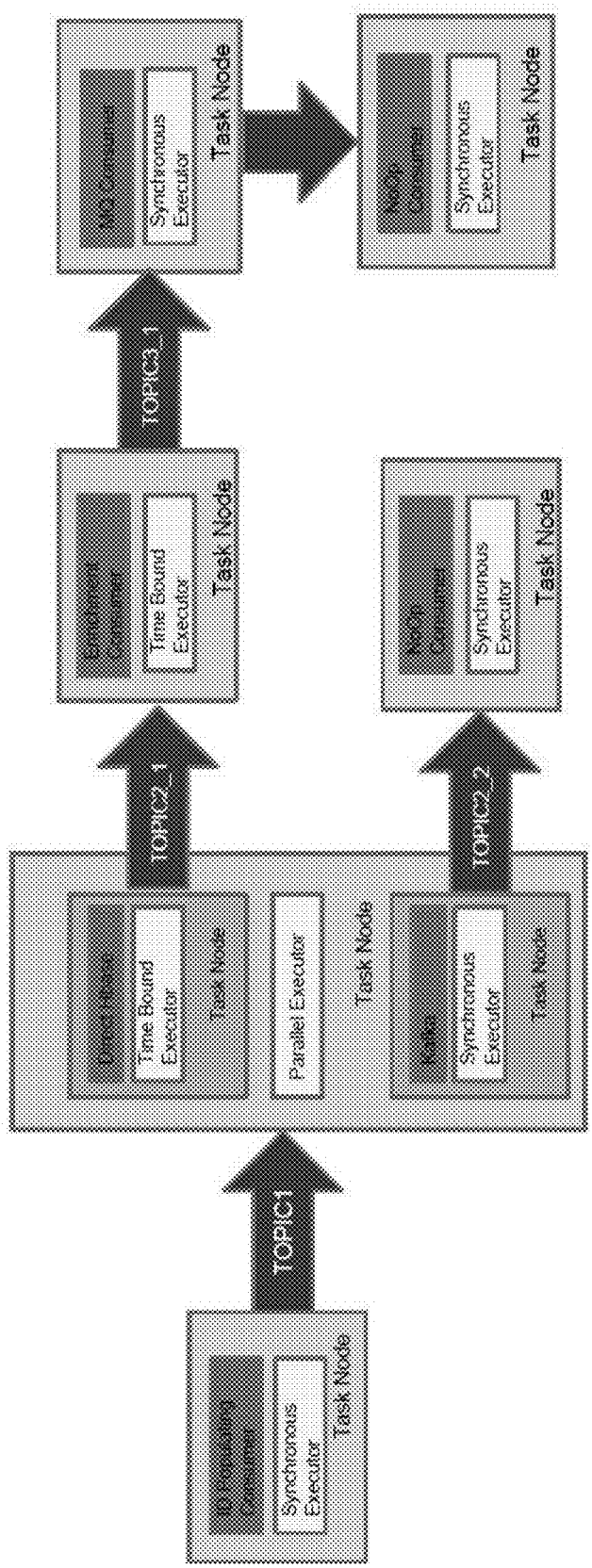

FIG. 5D illustrates example java code to implement another example set of consumers. Example java code 526 defines a first consumer, i.e. MQ consumer. Example java code 527 defines a second consumer, i.e. direct HBase consumer. Example java code 528 defines a third consumer, i.e. MQ 2 consumer. Example java code 529 defines a fourth consumer, i.e. ID generating consumer. A block diagram is shown to illustrate task nodes 522, 521, 524, and 520, corresponding to the first, second, third, and fourth consumers, respectively. Task nodes 521 and 524 may perform in parallel with each other. FIG. 5E illustrates a block diagram to illustrate task nodes of another example set of consumers.

Figure 5F:
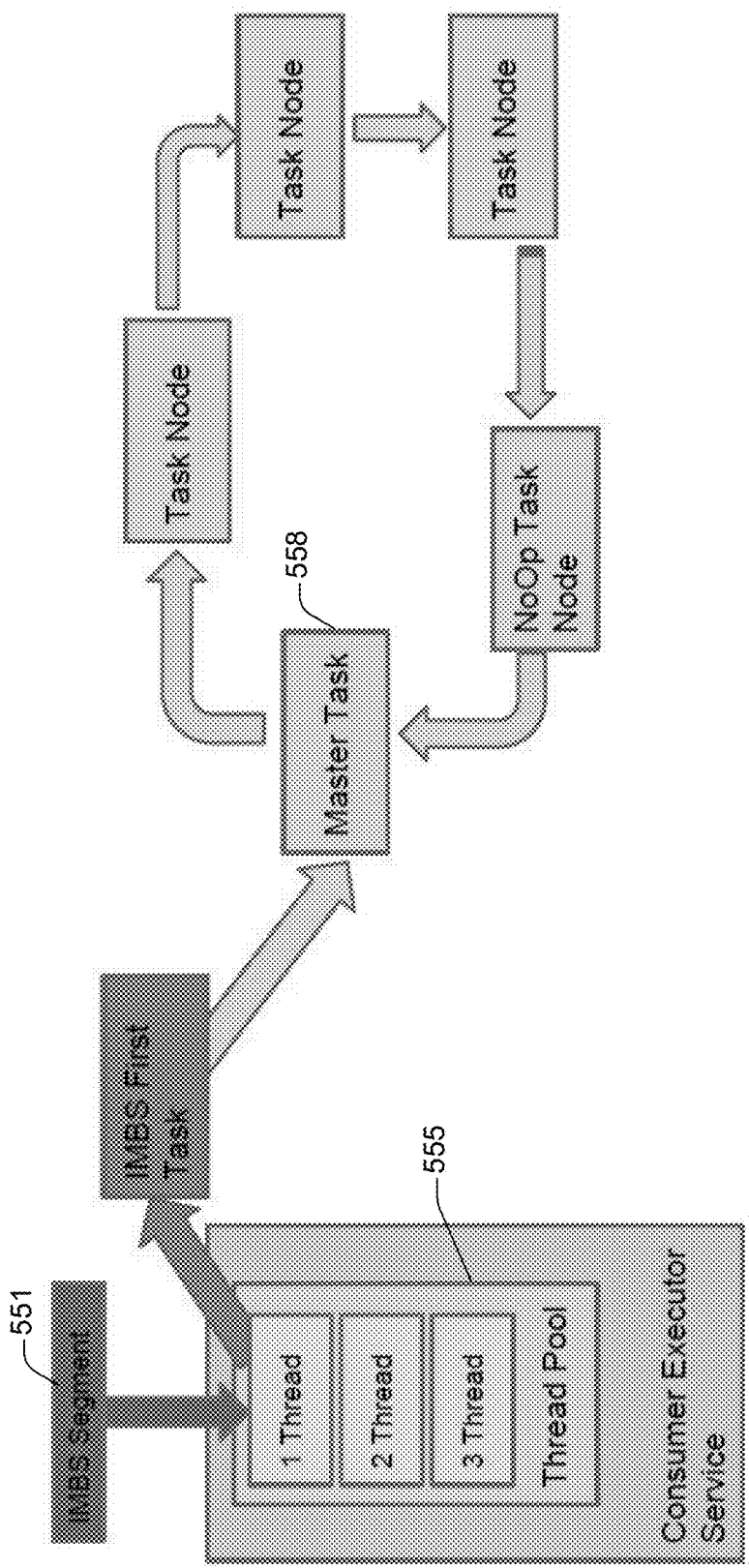
FIG. 5F illustrates a consumer task execution graph.

FIG. 5F illustrates a consumer task execution graph. This is an execution graph for an implementation with a consumer framework integrated with in memory buffer service. A group of events may be stored in an in memory buffer service segment 551. This group of events may be passed to a programmed task node of the consumer framework, which is to be executed by a random thread from the thread pool. 555 This thread pool 555 may be provided by a java concurrent library. Master task 558 may be a component of the consumer framework, which invokes and monitors the task nodes.

The number of segments for a given IMBS may be configurable. The number of threads in the thread pool, and the number of segments may be a deciding factor for providing parallelisms to this solution.

Figure 7:
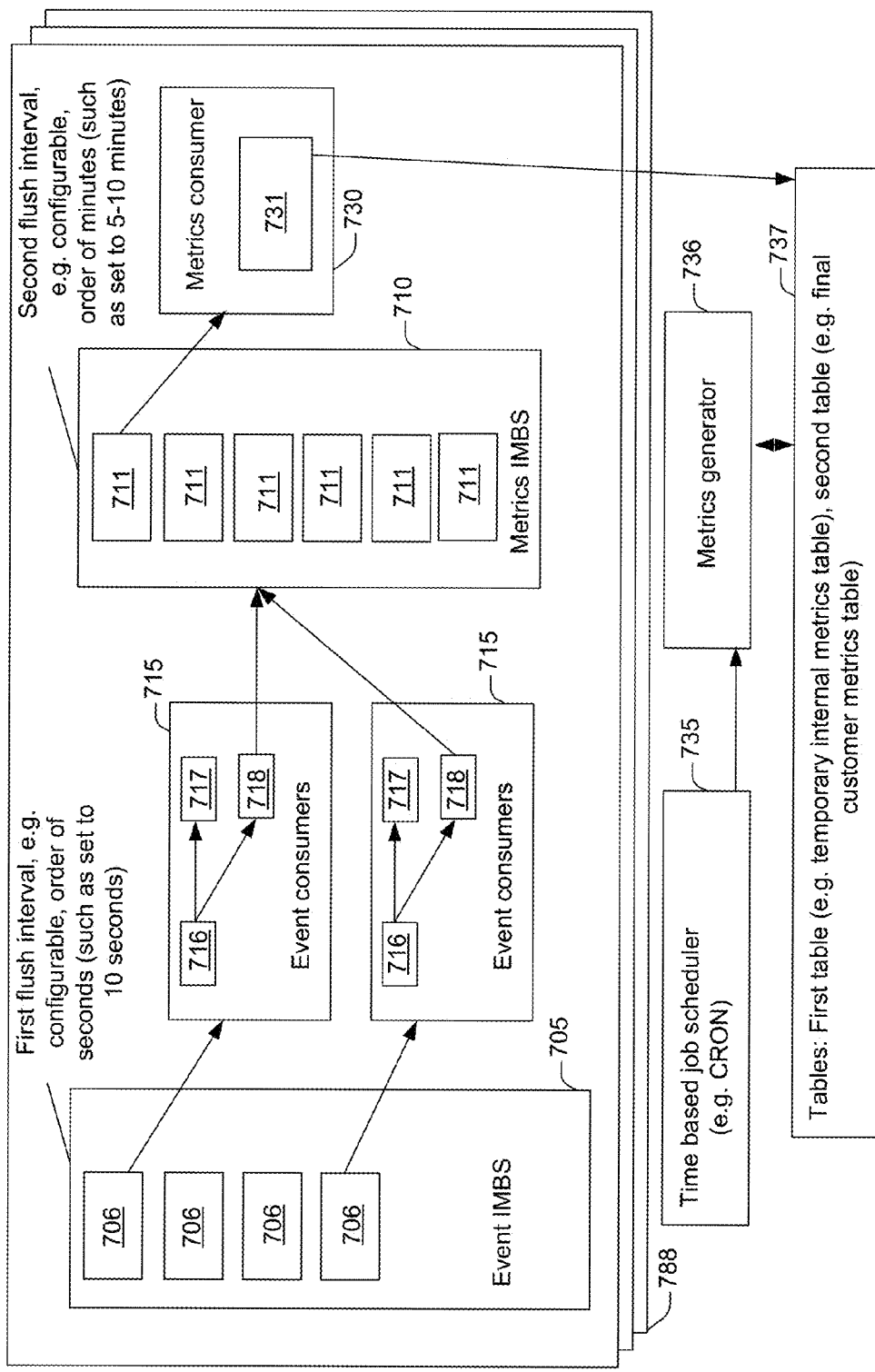
FIG. 7 illustrates a block diagram of a system for generating and storing real-time analytics metric data using an in memory buffer service consumer framework.

FIG. 7 illustrates a block diagram of a system for generating and storing real-time analytics metric data using an in memory buffer service consumer framework.

The system 700 may include any number of application servers 788, say 30 or 40 application servers 788. Each application server 788 may include a group of at least one event consumers 715 and a group of at least one metric consumers 731. The event consumers 715 and the metric consumers 731 may be generated according to the process previously described with reference to FIGS. 5A-F.

Figure 6:
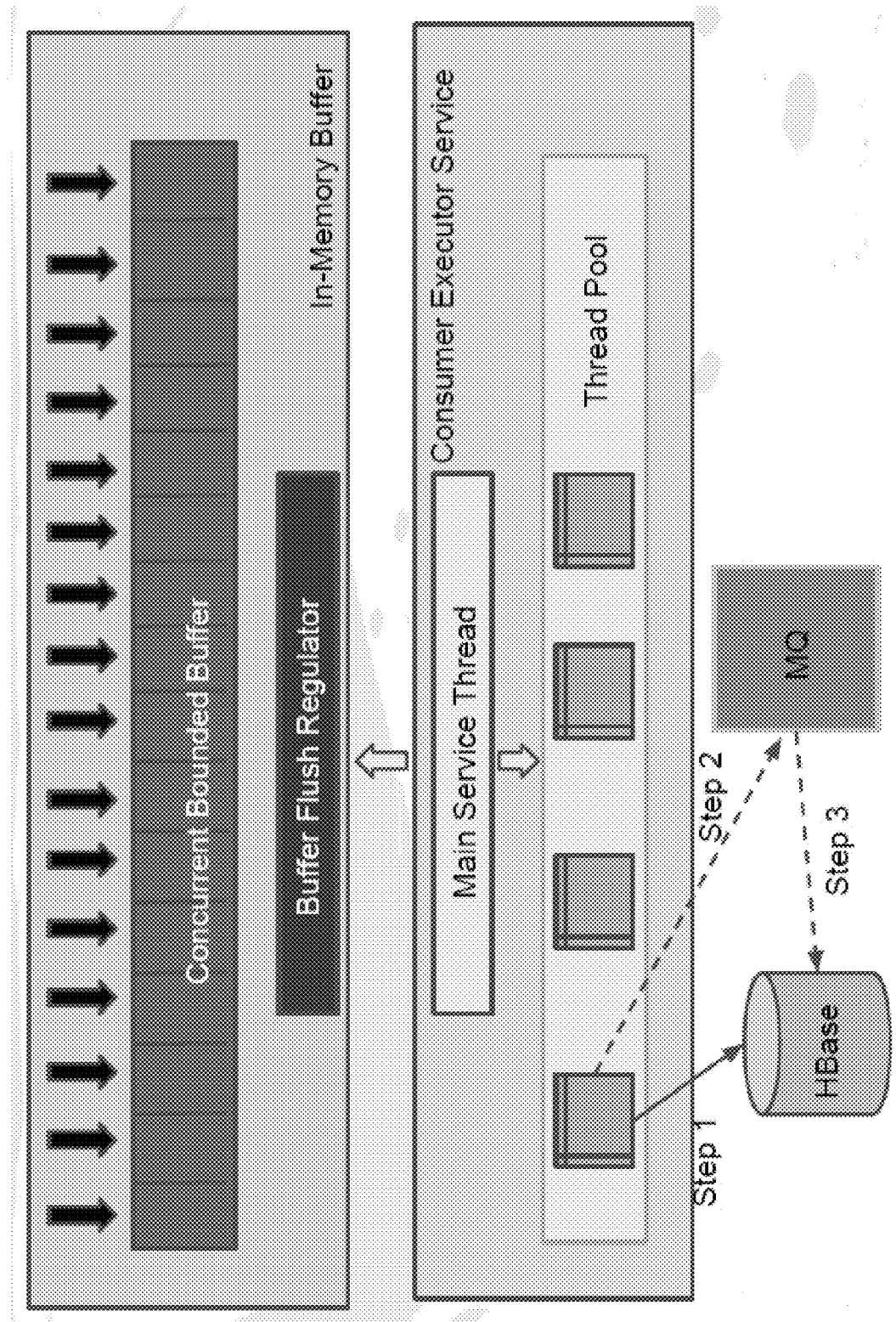
FIG. 6 illustrates a block diagram of an in-memory buffer system.

Each application server 788 may include in memory buffer systems (IMBSes) 705 and 710. In-memory buffer systems are known. An example of an in-memory buffer system is described in more detail din Non-provisional U.S. patent application Ser. No. 14/705,750 entitled IN-MEMORY BUFFER SERVICE, filed May 6, 2015. Also, FIG. 6 illustrates a block diagram of an in-memory buffer system. Referring again to FIG. 7, the IMBS 705 for event data (hereinafter "event IMBS") includes a first bounded buffer, e.g. a concurrent bounded buffer, and a first buffer flush regulator to enforce a first load factor associated with the first bounded buffer by dropping objects from the first bounded buffer according to at least one of a first predetermined object lifetime threshold or first predetermined time interval. The IMBS 710 for metric data (hereinafter "metric IMBS") includes a second bounded buffer, e.g. a concurrent bounded buffer, and a second buffer flush regulator to enforce a second load factor associated with the second bounded buffer by dropping objects from the second bounded buffer according to at least one of a second predetermined object lifetime threshold that is different than the first predetermined object lifetime threshold or a second predetermined time interval that is different than the first predetermined time interval. A flush interval of the event IMBS 705 may be configurable, and may be set to an order of seconds, e.g. tens of seconds, such as 10 seconds. The flush interval of the metrics IMBS 710 may also be configurable, and may be set to an order of minutes, such as 5 minutes, 10 minutes, or the like.

Each event consumer 715 consumes objects of a first type from a bounded buffer, e.g. a concurrent bounded buffer, of the event IMBS 705. In an example, the objects of the first type represent original data. In an example, the original data is event data. Each event consumer 715 may include task nodes, of which some example task nodes 716, 717, and 718 are illustrated. Examples of task nodes were previously discussed, for instance, task nodes 716, 717, and 718 may be defined process previously described with reference to FIGS. 5A-F.

Each segment 706 of event IMBS 705 may hold a collection/group of events. Events in a given segment 706 may be passed to an event consumer 715 for processing. In order to make consumption asynchronous in nature, a thread may be provided to execute the segment 706. The thread may be from a pre-configured thread pool.

In an example, each task node 716 of the event consumers 715 consumes objects from the event IMBS 705. Each task node 718 may generate the objects to be consumed by metric consumer 731. These objects generated by the task nodes 718 may be buffered by the metrics IMBS 710.

In an example, task nodes 717 may output event data to a non-relational distributed database, e.g. HBase. It should be appreciated that this operation may be in parallel with the outputting to the metrics IMBS 710 by the task nodes 718.

Each task node 731 of the metric consumer 730 consumes objects from a bounded buffer, e.g. a concurrent bounded buffer, of the metrics IMBS 710. In an example, the objects of the second type represent derived data. In an example, the derived data is metric data based on the event data.

Each segment 711 of metric IMBS 710 may hold a collection/group of events. Events in a given segment 711 may be passed to a metric consumer 730 for processing. In order to make consumption asynchronous in nature, a thread may be provided to execute the segment 711. The thread may be from a pre-configured thread pool.

The illustrated task node 731 of the metric consumer 730 writes to a table of tables 736 of a non-relational distributed database, e.g. HBase. In an example, the task node 731 writes to a first table, e.g. a temporary table for storing ongoing metrics per application server. In an example, there may be 30-40 application servers 788 consolidating data into a single temporary table. The first table may use a row key index. The first table may be organized per application server 788. For instance, the first table may have an entry for each application server 788.

The time based job scheduler 735 may operate according to an interval, e.g. a configurable interval, associated with the second interval, e.g. 10 minutes in an example. The time based scheduler 735 may cause the metrics generator 736 to, to at every occurrence of the interval, generate a metric value based on data from the first table of tables 737 (e.g. generate a metric from data aggregated over the period corresponding to the interval). In some implementations, the metrics generator 736 may be configured to aggregate and normalize the metrics written by the task node 731 of the application server 788 in the first table of tables 737, for each tenant. The output of metrics generator 736 may be stored in the second table of tables 737.

The generated metrics values for a given customer may be stored in a second table of tables 737, e.g. a final customer metrics table exposed to metric queries from a customer/tenant. The second table may be organized per customer/tenant. For instance, the second table may have an entry for each tenant/customer (contrast with the first table, which may be organized per application server 788).

The final table may be exposed to metric queries from the customer/tenant. Examples of metric queries include those described in more detail in U.S. patent application Ser. No. 14/688,989 entitled EXTRACTING AND PROCESSING METRICS FROM SYSTEM GENERATED EVENTS, filed Apr. 16, 2015.

The system and apparatus described above may use dedicated processor systems, micro controllers, programmable logic devices, microprocessors, or any combination thereof, to perform some or all of the operations described herein. Some of the operations described above may be implemented in software and other operations may be implemented in hardware. Any of the operations, processes, and/or methods described herein may be performed by an apparatus, a device, and/or a system substantially similar to those as described herein and with reference to the illustrated figures.

The processing system may execute instructions or "code" stored in memory. The memory may store data as well. The processing system may include, but may not be limited to, an analog processor, a digital processor, a microprocessor, a multi-core processor, a processor array, a network processor, or the like. The processing system may be part of an integrated control system or system manager, or may be provided as a portable electronic device configured to interface with a networked system either locally or remotely via wireless transmission.

The processor memory may be integrated together with the processing system, for example RAM or FLASH memory disposed within an integrated circuit microprocessor or the like. In other examples, the memory may comprise an independent device, such as an external disk drive, a storage array, a portable FLASH key fob, or the like. The memory and processing system may be operatively coupled together, or in communication with each other, for example by an I/O port, a network connection, or the like, and the processing system may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing system.

Operating instructions or commands may be implemented or embodied in tangible forms of stored computer software (also known as "computer program" or "code"). Programs, or code, may be stored in a digital memory and may be read by the processing system. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long as the stored information may be "read" by an appropriate processing system. The term "computer-readable" may not be limited to the historical usage of "computer" to imply a complete mainframe, mini-computer, desktop or even laptop computer. Rather, "computer-readable" may comprise storage medium that may be readable by a processor, a processing system, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A database system, comprising:
a first bounded buffer;
a first buffer flush regulator to enforce a first load factor associated with the first bounded buffer by flushing objects from the first bounded buffer according to at least one of a first predetermined object lifetime threshold or first predetermined time interval; and
a memory device having instructions stored thereon, the instructions including:
a plurality of first instructions, each first instruction defining a respective consumer of first consumers; and
a plurality of second instructions, each second instruction defining a task node for a respective one of the first consumers;
wherein a consumer of the first consumers is to consume objects of a first type from the first bounded buffer, and one of said task nodes that corresponds to a different consumer of the first consumers is to generate objects of a second type that is different than the first type for consumption by a second consumer that is different than the first consumers.

2. The database system of claim 1, wherein the instructions further comprise:
a third instruction defining the second consumer, wherein said second consumer is to consume objects of the second type; and
a fourth instruction defining a task node for the second consumer.

3. The database system of claim 2, wherein the system further comprises:
a second bounded buffer; and
a second buffer flush regulator to enforce a second load factor associated with the second bounded buffer by flushing objects from the second bounded buffer according to at least one of a second predetermined object lifetime threshold that is different than the first predetermined object lifetime threshold or a second predetermined time interval that is different than the first predetermined time interval;
wherein the objects of the second type are input to the second bounded buffer, and the task node corresponding to the second consumer consumes from the second bounded buffer.

4. The database system of claim 3, wherein the second predetermined object lifetime threshold is greater than the first predetermined object lifetime threshold.

5. The database system of claim 3, wherein the second predetermined time interval is greater than the first predetermined time interval.

6. The database system of claim 3, wherein the second predetermined object lifetime threshold is greater than the first predetermined object lifetime threshold by a configurable factor.

7. The database system of claim 6, wherein the configurable factor is set to at least ten.

8. The database system of claim 3, wherein the second predetermined time interval is greater than the first predetermined time interval by a configurable factor of at least six.

9. The database system of claim 8, wherein the configurable factor is set to at least six.

10. The database system of claim 2, wherein the objects of the first type comprise original data and the objects of the second type comprise derived data.

11. The database system of claim 2, wherein the objects of the first type comprise event data and the objects of the second type comprise metrics based on the event data.

12. The database system of claim 2, further comprising:
a non-relational distributed database to receive data output from the task node of the second consumer.

13. The database system of claim 12, wherein the non-relational distributed database further comprises a temporary table for storing ongoing metrics per application server.

14. The database system of claim 13, further comprising a metrics generator using a time-based job scheduler to access data from the temporary table in order to aggregate metric calculations across all application servers in a given timeframe for a given metric type for a given customer organization.

15. The database system of claim 2, wherein the fourth instruction is to assign an executor selected from a group of executors including a synchronous executor, a time bounded executor, and an asynchronous executor to the second consumer.

16. The database system of claim 1, wherein at least one of the second instructions is to assign an executor selected from a group of executors including a synchronous executor, a time bounded executor, and an asynchronous executor to a corresponding one of the first consumers.

17. A database system, comprising:
a first bounded buffer and a second bounded buffer;
a first buffer flush regulator to enforce a first load factor associated with the first bounded buffer by flushing objects from the first bounded buffer according to at least one of a first predetermined object lifetime threshold or first predetermined time interval, and a second buffer flush regulator to enforce a second load factor associated with the second bounded buffer by flushing objects from the second bounded buffer according to at least one of a second predetermined object lifetime threshold that is different than the first predetermined object lifetime threshold or a second predetermined time interval that is different than the first predetermined time interval;

a memory device having instructions stored thereon, the instructions including:

a plurality of first instructions, each first instruction defining a respective consumer of first consumers; and a plurality of second instructions, each second instruction defining a task node for a respective one of the first consumers;

wherein a consumer of the first consumers is to consume objects of a first type from the first bounded buffer, and one of the task nodes that corresponds to a different consumer of the first consumers is to generate objects of a second type that is different than the first type and output the generated objects to the second bounded buffer.

18. The database system of claim 17, wherein the instructions further comprise:

a third instruction defining a second consumer that is different than the first consumers, wherein said second consumer is to consume objects of the second type from the second bounded buffer; and a fourth instruction defining a task node for the second consumer.

19. The database system of claim 18, further comprising:

a non-relational distributed database to receive data output from the task node of the second consumer;

wherein the non-relational distributed database further comprises a temporary table for storing ongoing metrics per application server.

20. The database system of claim 19, further comprising a metrics generator using a time-based job scheduler to access data from the temporary table in order to aggregate metric calculations across all application servers in a given timeframe for a given metric type for a given customer organization.

* * * * *